UNITED STATES PATENT OFFICE.

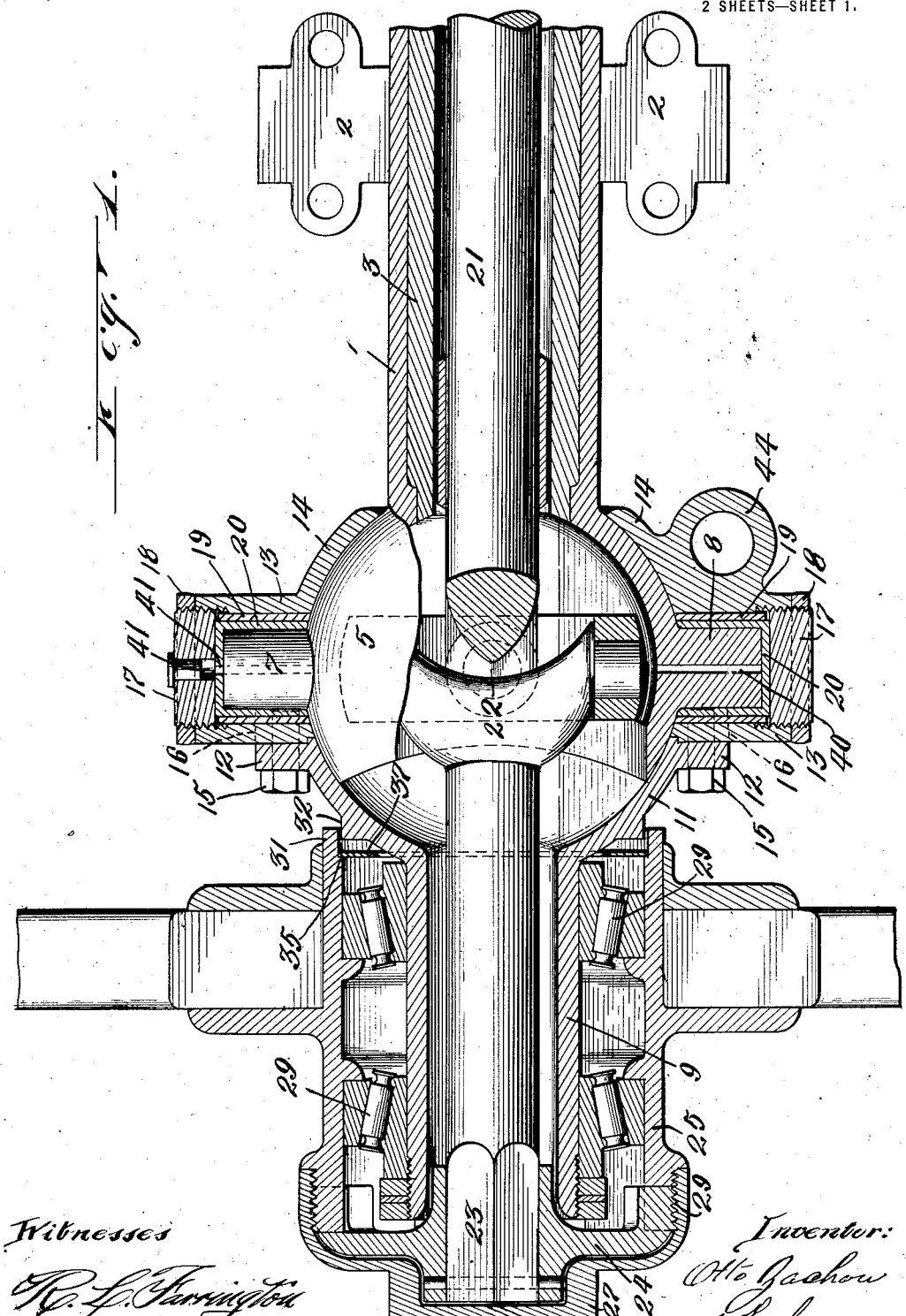

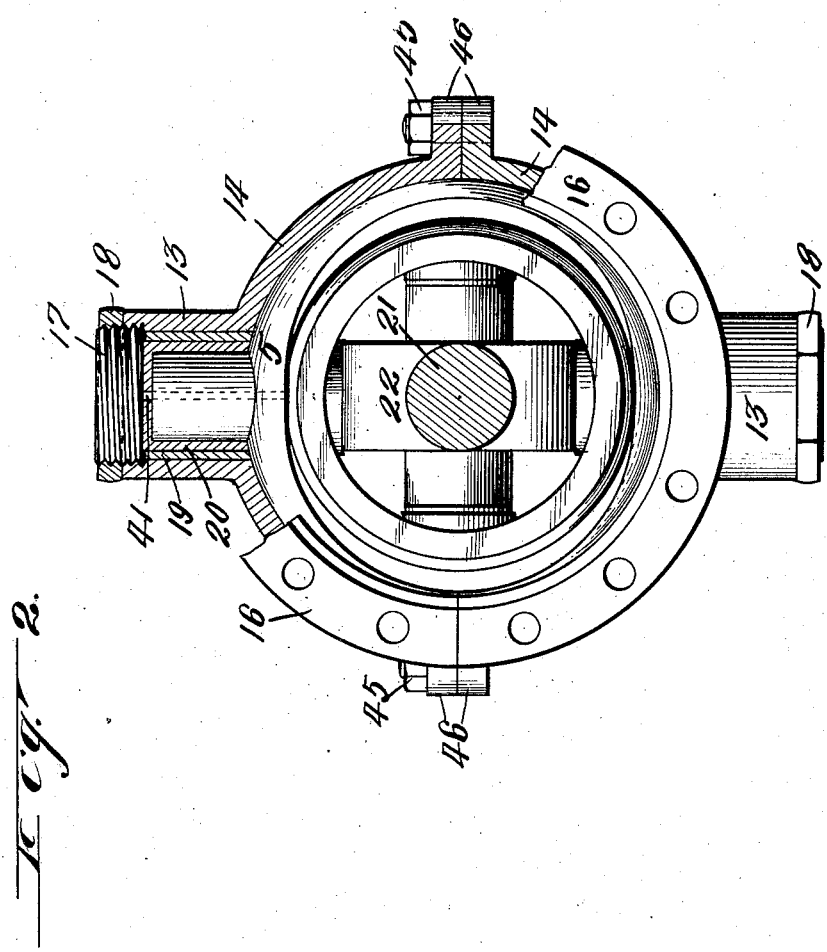

OTTO ZACHOW, OF CLINTONVILLE, WISCONSIN, ASSIGNOR TO FOUR WHEEL DRIVE AUTO COMPANY, OF CLINTONVILLE, WISCONSIN, A CORPORATION OF WISCONSIN.

DRIVING AND STEERING AXLE.

1,153,281.   Specification of Letters Patent.   Patented Sept. 14, 1915.

Application filed October 21, 1910. Serial No. 588,275.

*To all whom it may concern:*

Be it known that I, OTTO ZACHOW, a citizen of the United States, residing at Clintonville, county of Waupaca, and State of Wisconsin, have invented new and useful Improvements in Driving and Steering Axles, of which the following is a specification.

My invention relates to improvements in combined driving and steering axles.

The object of my invention is to provide a structure, which will have greater strength, stability and durability than those heretofore employed, and which will be more adequately lubricated, and the lubricant retained by a device which also includes means for preventing the admission of dust and grit to the bearings, including the axle bearings.

In the following description, reference is had to the accompanying drawings, in which—

Figure 1 is a vertical sectional view, drawn substantially to a plane which includes the axis of the driving shaft, said shaft, however, being illustrated in full. Fig. 2 is an end view with the vehicle wheel and stub axle removed, together with that portion of the pivot bearing member which is integrally connected therewith, the outer portion of the driving axle being shown in cross section.

Like parts are identified by the same reference characters in both views.

The structure illustrated in the drawings is of a type known as the stub axle type of construction, the vehicle wheel being pivotally supported from the frame, so that the wheel may swing for steering purposes in an arc about a pivotal axis adjacent to the inner side of the wheel.

In the drawings, a non-rotatable sleeve 1 is connected with the vehicle frame or running gear by suitable brackets or coupling members 2. The sleeve 1 is preferably mounted upon a tubular axle shaft 3, which is also supported from the vehicle frame and is non-rotatable. The sleeve 1 is provided at its outer end with a bearing member 5, having a spherically rounded outer surface. This member 5 is also provided at top and bottom with vertically extending pivot posts 7 and 8, preferably integrally formed with the member 5.

A tubular stub axle 9 is provided with a bearing member 11, which incloses the member 5, the inner surface of said bearing member 11 being spherically concave and adapted to fit the outer surface of the member 5. This member 11 is provided with an outwardly extending marginal flange 12, whereby it may be connected with detachable sections 14, by suitable securing devices, such as bolts 15, said sections 14 being provided with flanges 16, to receive said bolts. The sections 14 of the bearing member 11, (when in position), cover the inwardly converging portion of the member 5 to a point near the sleeve 1. These sections 14 of the member 11 are also provided with tubular pivot boxes 13, adapted to be closed by screw threaded head pieces 17, secured in part by lock nuts 18. Each of the pivot boxes 13 is of sufficient internal diameter to receive a tubular bushing 19, and a cap 20, the latter being fitted to the trunnions 7 (or 8). By removing the head pieces 17, the caps 20 and bushings 19 may be readily removed and replaced when worn.

A driving axle shaft 21 extends through the sleeve 1, member 5 and stub axle 9, this shaft being provided with a double knuckle or universal joint in the plane of the pivot posts 7 and 8, as illustrated at 22. The outer section of the shaft 21 has its extremity squared, as shown at 23, to receive a coupling member 24, which interlocks with the hub 25 of the vehicle wheel, whereby motion may be transmitted from the driving axle to the wheel. A removable cap 27 incloses the coupling 24, and has threaded engagement at 29 with the hub, and with the portions of the coupling 24, which interlock therewith. The wheel hub is mounted to rotate upon the stub axle 9 with interposed roller bearings 29 of any ordinary construction.

The hub 25 is provided with a portion 31, which extends over an annular shoulder 32 on the bearing member 11, and rotates in close proximity to said shoulder, thus tending to exclude dust and grit from the bearings. The portion 31 is provided with an interior shoulder 35, against which a collar 37 is seated. The inner margin of this collar extends inwardly toward the junction of the stub axle 9 with the bearing member 11, whereby a considerable quantity of oil may be retained in the hub bearing, it being necessary that said oil accumulate to a depth greater than the width of the collar 37 before the oil can flow outwardly between the part 31 of the hub and the annular projection 32.

Oil ducts 40 extend vertically through the caps 20 and trunnions 7 and 8 respectively. The upper head piece 17 is provided with an opening 41, which registers with the oil duct 40, which extends through the trunnion 7. This allows a supply of oil to be inserted in the cavity occupied by the universal joint 22 and the steering joint formed by the pivot posts 7 and 8 and the bearing members 5 and 11. A sufficient supply of oil may be inserted to fill the lower portion of this cavity up to the under side of the driving shaft. The driving shaft joint will therefore revolve in oil on the under side and the oil will also be permitted to distribute between the bearing members 5 and 11. The aperture 41 in the upper head piece 17, is preferably made larger than the oil duct 40, whereby some of the oil will flow outwardly over the upper cap 20, instead of passing directly through the duct 40 to the lower portion of the bearing. The duct 40, which extends through the pivot posts 8 and the lower cap 20, will of course permit the oil to distribute over the outer surface of said lower cap 20 and to effectually lubricate this bearing.

It will be understood that my invention may also be applied to vehicles, in which the power is not applied to the steering wheels, and that in such cases, it is not necessary that the bearing member 5 should be hollow, or if hollow, that it should have openings in its inner and outer surfaces, but where the power is to be applied to the steering wheel by means of a shaft extending through the pivot bearings, it is of course necessary that the member 5 should be hollow and that the driving shaft should be jointed, substantially at the pivotal axis. The opening at the outer side of the bearing member 5 must also have a sufficient width in the horizontal dimension, to allow the outer section of the driving shaft to swing with the stub axle and the wheel, when the vehicle is turning. For this reason, the opening at the outer side of the member 5 is made elliptical in form, whereby the member 11 extends over a sufficient area of the member 5 at the top and bottom, to secure a firm bearing upon the member 5 independently of the detachable sections 14. The steering connections for swinging the stub axle 9, may be connected with an outwardly projecting ear 44. The sections 14 of the bearing member 11 provide for its adjustment over the convex surface of the bearing member 5 and the pivot posts 7. These sections are preferably half sections, abutting in a horizontal plane, and the sections are secured together by bolts 45, which extend through ears or flanges 46 at the margins of the respective sections, as shown in Fig. 2.

The terms and expressions in this description and the appended claims are employed for the purpose of description and not of limitation, it not being my intention to exclude from the scope of my invention any mechanical equivalents for the specific features of construction shown and described.

Having thus described my invention, what I claim as new, and desire to secure by Letters Patent, is—

1. A driving and steering axle, including the combination of a spherically rounded outer bearing shell formed in sections, two of which are provided with pivot post sockets located out of registry with the joint lines of the sections, and an inner bearing shell, having spherically rounded outer bearing surfaces in bearing contact with the inner surface of the outer shell and having pivot posts fitted to said sockets.

2. A driving and steering axle, including a spherically rounded outer bearing shell formed in three sections, comprising upper and lower connected sections, each provided with integral tubular bearing sockets, closed at their outer ends and adapted to receive a set of pivot posts, the axes of which coincide with a vertical line drawn through the center of the shell, the third section being connected to the other two in an annular zone exterior to that occupied by the bearing members, and the interior surfaces of said three sections being continuous each with the other in spherical curvature.

3. A driving and steering axle, including the combination of an axle member provided with a spherically rounded bearing shell at one end thereof having a set of integral vertically projecting pivot posts, and another member, having a spherically rounded bearing shell, provided with outwardly projecting tubular bearing sockets in which said pivot posts engage, said bearing shells having mutual bearing contact with each other on all sides of the pivot posts.

4. A driving and steering axle, including the combination of an axle member provided with a spherically rounded bearing shell at one end thereof, having a set of integral vertically projecting pivot posts, and another member, having a spherically rounded bearing shell, provided with outwardly projecting tubular bearing sockets in which said pivot posts engage, said bearing shells having mutual bearing contact with each other on all sides of the pivot posts, and said outer shell being formed in sections connected with each other along lines out of registry with the sockets and pivot posts.

5. A driving and steering axle, including the combination of an axle member provided with a spherically rounded bearing shell at one end thereof, having a set of integral vertically projecting pivot posts, and another member, having a spherically rounded bearing shell, provided with outwardly projecting tubular bearing sockets in which said pivot posts engage, said bearing shells having mutual bearing contact with each other on all sides of the pivot posts, said tubular sockets being provided with removable caps, and also having removable bushings embracing the pivot posts.

In testimony whereof I affix my signature in the presence of two witnesses.

OTTO ZACHOW.

Witnesses:
　VALBERG M. OLEN,
　O. L. OLEN.